(12) United States Patent
Allain et al.

(10) Patent No.: US 11,807,373 B2
(45) Date of Patent: Nov. 7, 2023

(54) PYLON INCLUDING A PRIMARY STRUCTURE FORMED OF AT LEAST ONE LONGERON AND ONE PANEL ASSEMBLED BY WELDING

(71) Applicant: Airbus Operations SAS, Toulouse (FR)

(72) Inventors: Julien Allain, Toulouse (FR); Stéphane Dida, Toulouse (FR); Jérome Colmagro, Toulouse (FR); Olivier Dubois, Toulouse (FR); Julien Moulis, Toulouse (FR); Jacky Puech, Toulouse (FR); Laurent Lafont, Toulouse (FR)

(73) Assignee: Airbus Operations SAS

( * ) Notice: Subject to any disclaimer, the term of this patent is extended or adjusted under 35 U.S.C. 154(b) by 234 days.

(21) Appl. No.: 17/081,193

(22) Filed: Oct. 27, 2020

(65) Prior Publication Data
US 2021/0130001 A1    May 6, 2021

(30) Foreign Application Priority Data

Oct. 30, 2019  (FR) ...................................... 19 12168

(51) Int. Cl.
*B64D 27/26*    (2006.01)
*B64F 5/10*     (2017.01)
*F16B 5/08*     (2006.01)

(52) U.S. Cl.
CPC ................ *B64D 27/26* (2013.01); *B64F 5/10* (2017.01); *F16B 5/08* (2013.01); *B64D 2027/266* (2013.01)

(58) Field of Classification Search
CPC .......................... B64D 27/26; B64D 2027/264
See application file for complete search history.

(56) References Cited

U.S. PATENT DOCUMENTS

| | | | |
|---|---|---|---|
| 2014/0151497 A1* | 6/2014 | Weir | B64D 27/26 244/54 |
| 2019/0127073 A1 | 5/2019 | Colmagro et al. | |
| 2019/0127074 A1 | 5/2019 | Colmagro et al. | |

FOREIGN PATENT DOCUMENTS

| | | |
|---|---|---|
| EP | 3476739 A1 | 5/2019 |
| EP | 3476740 A1 | 5/2019 |

OTHER PUBLICATIONS

French Search Report for Application No. 1912168 completed Jul. 2, 2020, 2 pages.

* cited by examiner

*Primary Examiner* — Philip J Bonzell
*Assistant Examiner* — Eric Acosta
(74) *Attorney, Agent, or Firm* — Lerner David LLP

(57) ABSTRACT

The pylon, intended to support a flying vehicle engine, includes a primary structure formed by at least one longeron and one panel, the panel including at least one end part provided with a notch, the longeron being provided with an end adapted to be positioned in the notch, the panel and the longeron being assembled by welding a part of the end to a part of the notch. A welded primary structure enables minimization of the blanks of parts associated with the longerons and with the panels by avoiding having recourse to the production of edges.

10 Claims, 3 Drawing Sheets

PYLON INCLUDING A PRIMARY STRUCTURE FORMED OF AT LEAST ONE LONGERON AND ONE PANEL ASSEMBLED BY WELDING

FIELD OF THE INVENTION

The present invention concerns a pylon intended to support an aircraft engine under an aircraft wing, the pylon including a primary structure formed by at least one longeron and one panel assembled by welding, as well as an aircraft provided with such a pylon.

BACKGROUND OF THE INVENTION

As a general rule, a flying vehicle such as an aircraft, in particular a transport aircraft, is propelled by engines. Here is meant by engine any type of propulsion means such as a turboprop, a turbojet, etc. Each engine may be attached by a pylon under a wing, also known as an airfoil, to the fuselage of an aircraft or to other elements such as the tail unit.

A pylon usually supports the engine and transmits the forces generated by the operation of the engine to the airfoil of the aircraft. It also enables the transmission of fuel, electricity, hydraulics and air between the engine and the aircraft.

To fulfill its functions the pylon includes a rigid primary structure preferably made of titanium. This primary structure is formed of a plurality of ribs arranged successively in a longitudinal direction and constituting the framework of a "box section" type compartment. The ribs connect an upper longeron and a lower longeron while panels arranged laterally complete the box section. Each longeron is generally fixed by its edges to the side panels by means of bolt type fixing means.

The manufacture of a primary structure usually entails the production of blanks of the parts that respectively correspond to the side panels and to the upper and lower longerons. Each blank is machined in order to obtain the side panels and the longerons forming the primary structure. After machining the edges of each lateral panel and of each longeron are pierced throughout their length and then brought into contact in order to be fixed together by the bolts.

The production of a primary structure box section requires a large quantity of raw material including a proportion of material waste, which can generate high production costs, in particular due to the necessity to produce the edges.

Such a solution is therefore not completely satisfactory.

The documents US2014/151497 and EP3476740 disclose such pylons in which side panels are assembled to form the pylon.

BRIEF SUMMARY OF THE INVENTION

Aspects of the present invention may remedy this disadvantage. An aspect concerns a pylon intended to support an engine of a flying vehicle, in particular an aircraft, and including a primary structure formed by at least one longeron and one panel.

According to an embodiment of the invention, said panel includes at least one end part in which a notch is formed, said longeron being provided with at least one end adapted to be positioned in said notch, said panel and said longeron being assembled by welding at least a part of said end to at least a part of said notch.

According to an aspect of the invention, the primary structure is therefore produced by welding its components, which minimizes the blanks of the parts associated with the longerons and with the panels by avoiding recourse to the production of edges. Moreover, welding of the end of the longeron in the notch of the end part of the panel renders the assembly more robust and simpler to produce.

Said notch is advantageously formed of an abutment, said end of the longeron including a contact face, at least a part of said abutment being conformed to said contact face.

In accordance with a first embodiment, said notch also includes a lip formed in a plane parallel to said longeron, said lip forming with the abutment an angle substantially equal to 90 degrees.

In accordance with a second embodiment, said notch also includes a lip formed in a plane parallel to said longeron, said lip forming an angle greater than 90 degrees with the abutment.

Moreover, in accordance with a first embodiment, said end also includes a surface part of said longeron, said surface part being in contact with said lip of the notch.

Moreover, in a second embodiment, said end also includes a surface part of said longeron, said surface part and said lip of the notch being spaced apart from one another.

In accordance with a first particular embodiment the weld is produced at a surface joining at least a part of said abutment with said contact face.

In a second particular embodiment, the weld is produced on a surface joining the abutment with the contact face and on a part of the surface where said lip of the notch joins the surface part of said longeron.

In accordance with a first embodiment, the weld is produced in a continuous manner along said end of the longeron.

In accordance with a second embodiment, the weld is produced in a discontinuous manner along said end of the longeron.

The pylon advantageously includes a primary structure formed of a plurality of pairs of panels and longerons, each of the pairs including a panel and a longeron and the longeron and the panel of each of said pairs are assembled by welding as described hereinabove.

The present invention also concerns a method of welding a panel and a longeron forming part of the pylon as described hereinabove.

In accordance with an aspect of the invention said method includes the following steps:
- a step of producing the notch in the end part of said panel;
- a step of positioning said end of said longeron in said notch in said panel; and
- a step of welding a part of said end of said longeron to at least a part of said notch.

The present invention moreover concerns a flying vehicle, in particular an aircraft, that is provided with a pylon as described hereinabove.

BRIEF DESCRIPTION OF THE DRAWINGS

The appended figures will clearly explain how the invention may be reduced to practice. In those figures identical references designate similar elements.

DETAILED DESCRIPTION

Figure 2:
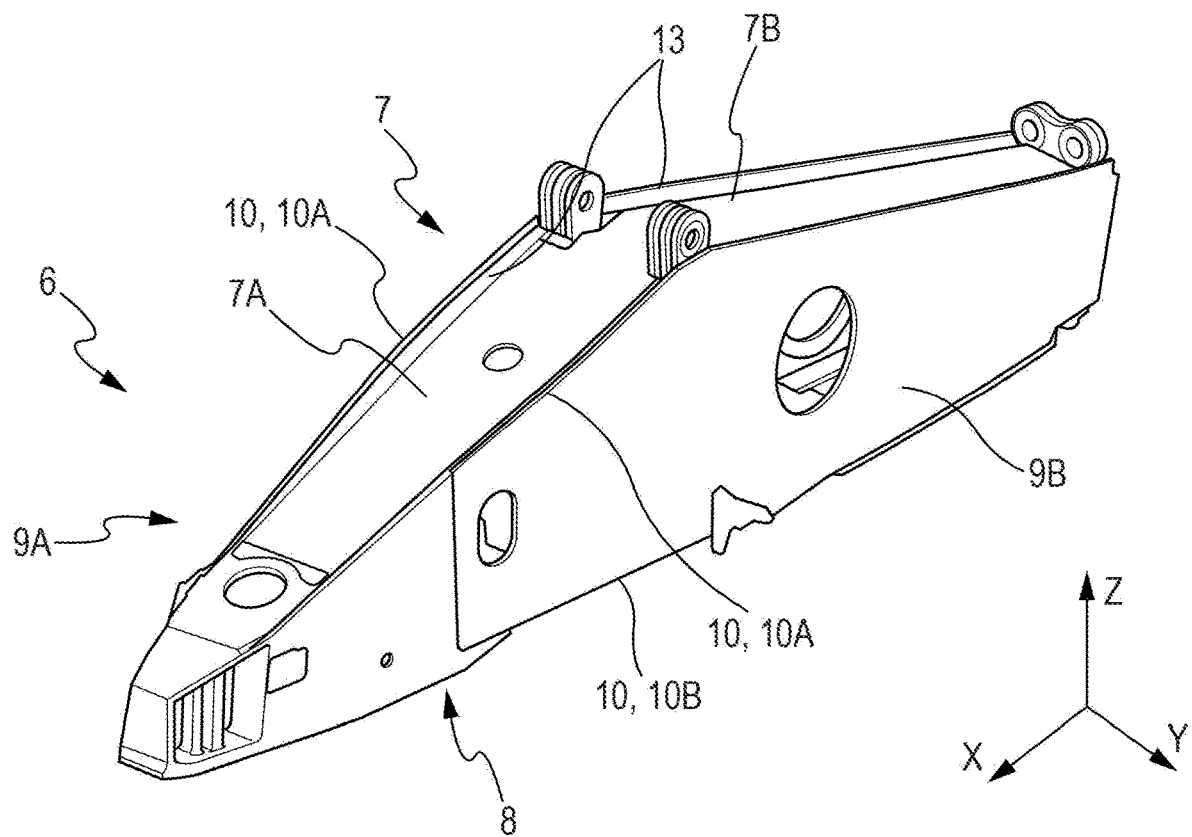
FIG. 2 is a schematic representation of a primary structure of a pylon in accordance with one embodiment.

A flying vehicle engine propels the latter. It is generally connected to the rest of the structure of the flying vehicle by a pylon 1 as represented in FIG. 2. In the context of the invention a flying vehicle may be an aircraft, a flying wing, an airplane with no fuselage, etc.

Figure 1:
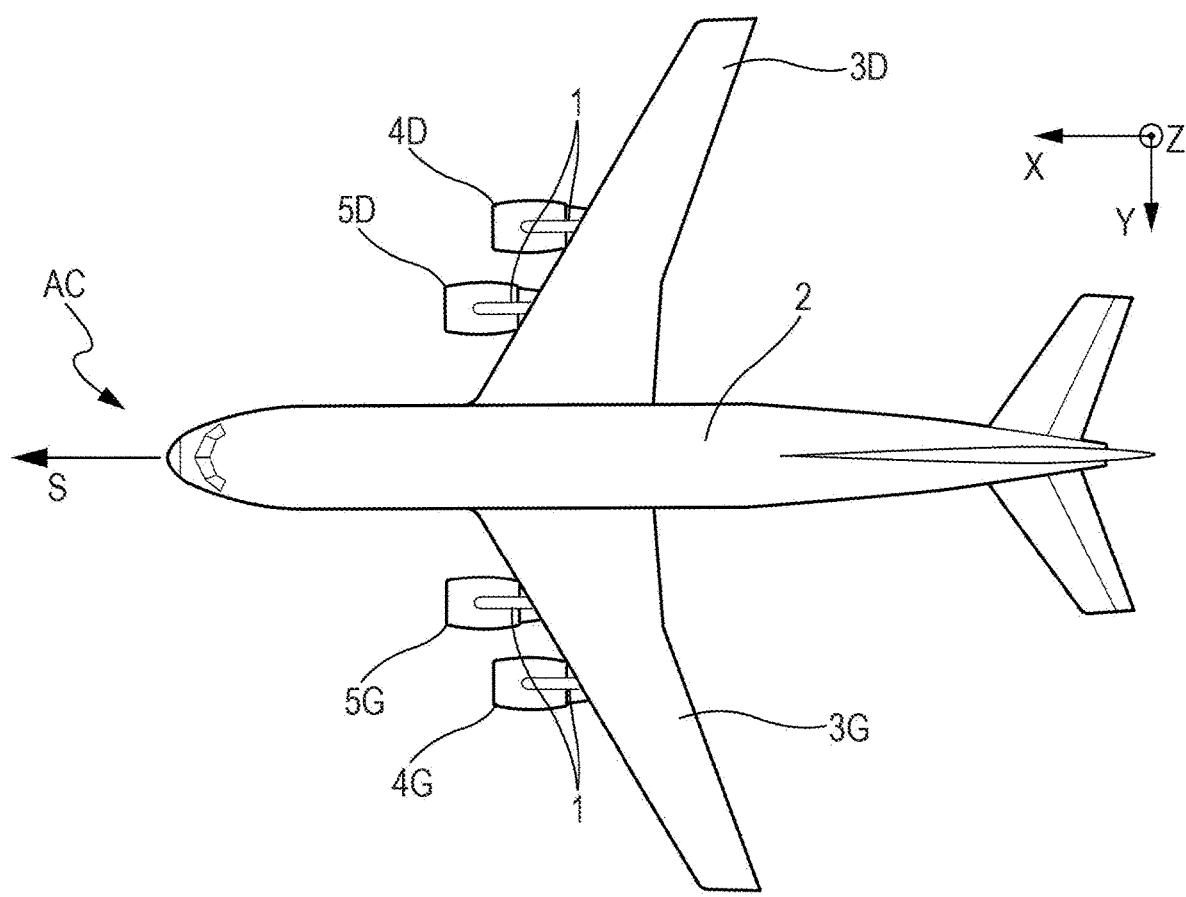
FIG. 1 represents schematically a view from above of an aircraft equipped with pylons in accordance with one embodiment.

In a preferred application described hereinafter with reference to FIG. 1 the flying vehicle is an aircraft AC, in particular a transport aircraft. That aircraft AC includes a fuselage 2 to which two wings 3G, 3D are fixed on respective opposite sides. These wings 3G and 3D are also referred to as airfoils 3G, 3D. The aircraft AC also includes engines 4G, 5G, and 4D, 5D for propelling it in a forward direction S. The pylon 1 for illustrating the invention and represented in FIGS. 1 and 2 is adapted to support each of the engines 4G, 5G, 4D, 5D under the wings 3G and 3D.

To facilitate the following description three mutually orthogonal directions are introduced. A direction X corresponds to the longitudinal direction of the pylon 1 and is parallel to the longitudinal direction of the fuselage 2 of the aircraft AC oriented in the forward direction S of the aircraft AC. Moreover, a transverse direction Y corresponds to the direction oriented transversely relative to the pylon 1. The transverse direction Y also corresponds to the general direction in which the wings 3G and 3D of the aircraft AC extend. Finally, a vertical direction Z corresponds to the vertical direction of the pylon 1 and is parallel to the direction representing the height.

Moreover, the adjectives "front" and "rear" are defined relative to the longitudinal direction X, respectively in the forward direction S of the aircraft AC when the engines are exerting a thrust and in the direction opposite to the forward direction S. Moreover, the adjectives "upper" and "lower" are defined relative to the vertical direction Z respectively toward the wing 3G, 3D and toward the engines 4G, 5G, 4D, 5D. Finally, the adjectives "external" and "internal" are defined relative to the transverse direction Y, respectively toward the tip of the wings 3G, 3D and toward the fuselage 2.

As represented in FIG. 2, the pylon 1 includes a primary structure 6 in the form of a box section that extends along the longitudinal direction X. The primary structure 6 is formed of an upper longeron 7. That upper longeron 7 includes an front upper longeron 7A and an rear upper longeron 7B each of which is of substantially elongate shape in the longitudinal direction X. The front upper longeron 7A and the rear upper longeron 7B are arranged successively in the longitudinal direction X and are fixed together in the transverse direction Y by fixing means (not represented). For example, those fixing means are welds. The front upper longeron 7A and the rear upper longeron 7B extend in planes substantially perpendicular to the vertical direction Z. The planes in which the front upper longeron 7A and the rear upper longeron 7B extend have a non-zero angle between them.

The primary structure 6 also includes a lower longeron 8 of substantially elongate shape in the longitudinal direction X. The upper longeron 7 and the lower longeron 8 are connected by two side panels extending in planes that may be substantially perpendicular to the transverse direction Y. Those side panels include an internal lateral panel 9A (hereinafter "internal panel 9A") and an external lateral panel 9B (hereinafter "external panel 9B"). In a preferred embodiment the internal panel 9A and the external panel 9B are arranged in planes inclined to one another.

As represented in FIG. 2, each of the side panels is provided with end parts 10 extending substantially along the longitudinal direction X. The end parts 10 include an upper part 10A and a lower part 10B arranged opposite one another in the vertical direction Z.

In a preferred embodiment a notch 17 is formed in the upper part 10A of the internal panel 9A and the external panel 9B so as to be arranged facing the upper longeron 7. A notch 17 is also formed in the lower part 10B of the internal panel 9A and the external panel 9B so as to be placed facing the front upper longeron 7A and the rear upper longeron 7B. Each notch 17 formed in a lower part 10B extends in the direction in which the lower longeron 8 extends. Each notch 17 formed in an upper part 10A extends in the direction in which the front upper longeron 7A and the rear upper longeron 7B extend.

Figure 3:
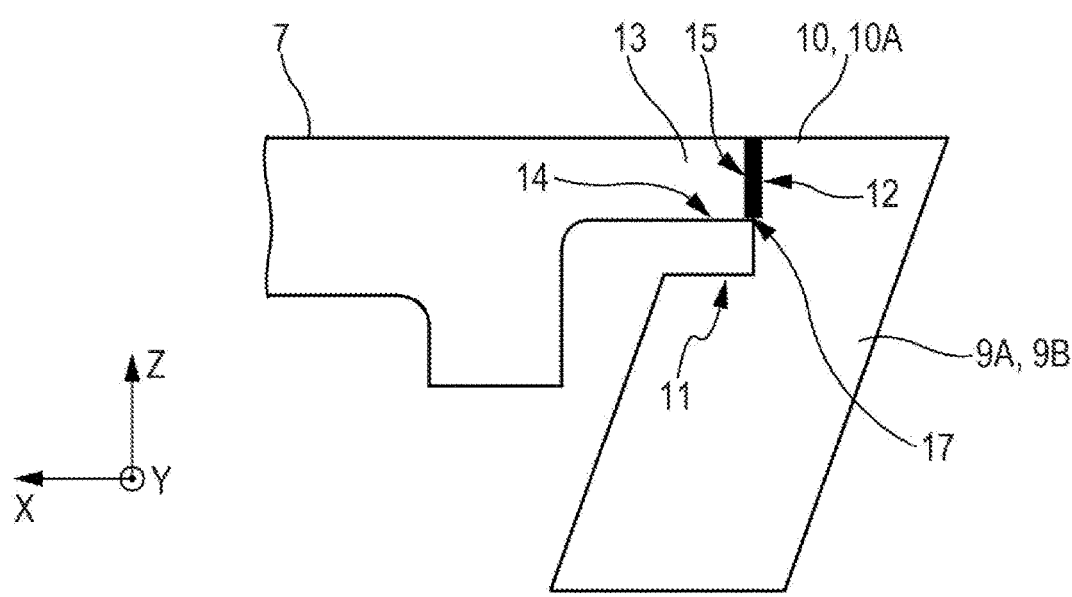
FIG. 3 illustrates schematically in cross section a longeron and a panel assembled in accordance with one embodiment.
Figure 4A:
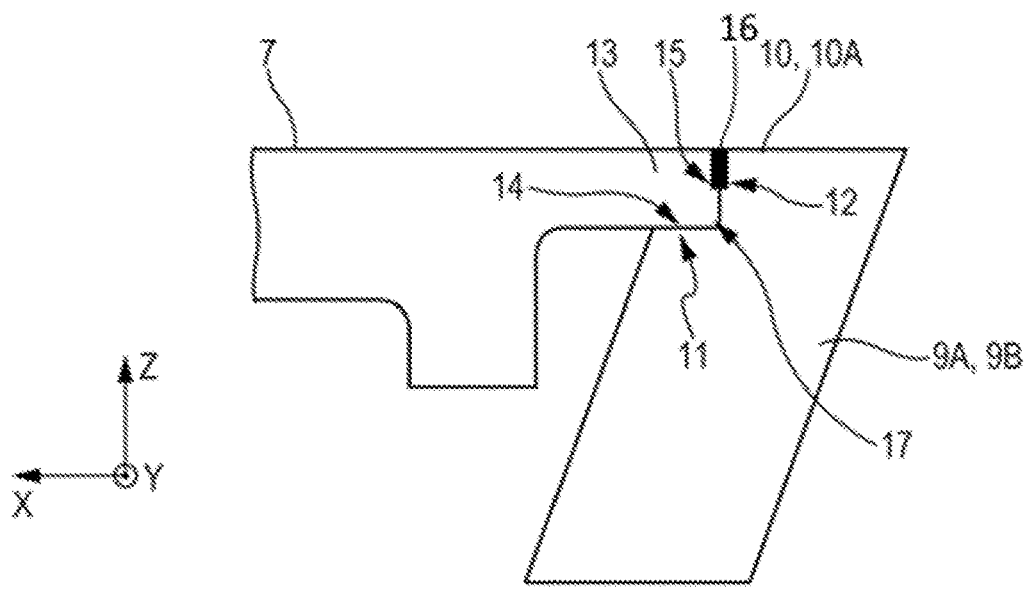
FIGS. 4A and 4B illustrate schematically in cross section a weld bead in accordance with a first and a second embodiment.
Figure 4B:
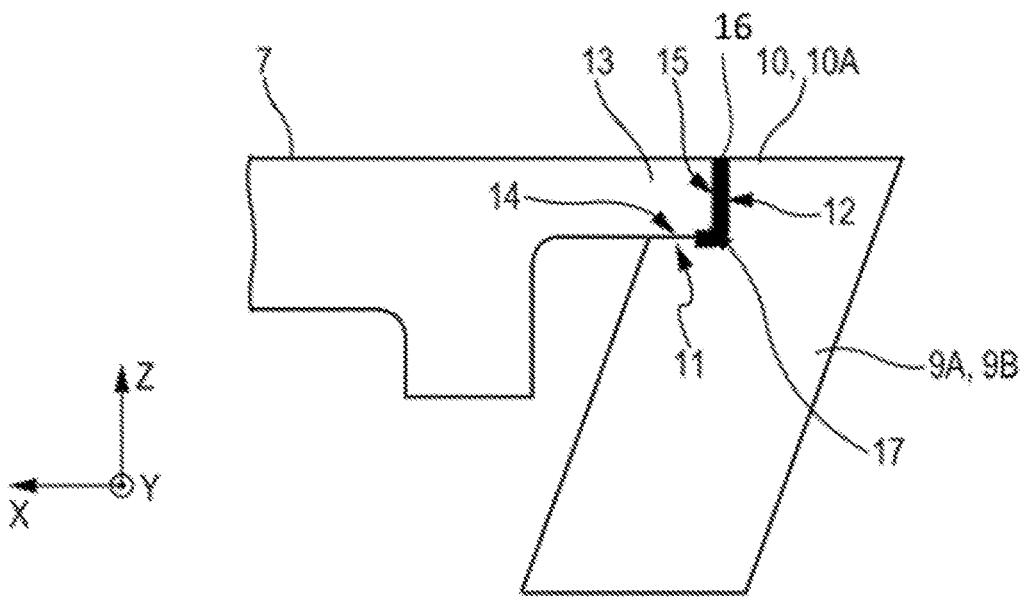

As represented in FIGS. 3, 4A and 4B, each notch 17 formed in the upper part 10A is formed of an abutment 12. The abutments 12 of the upper edges 10A of the internal panel 9A and of the external panel 9B face one another. In a similar manner, each notch 17 formed in the lower part 10B of each of the internal panel 9A and the external panel 9B includes an abutment 12 (not represented) against which the lower longeron 8 is arranged.

Moreover, the abutment 12 of the notch 17 in the upper part 10A is configured to be in contact with the upper longeron 7. The abutment 12 of the lower part 10B is adapted to be in contact with the lower longeron 8. The abutments 12 are adapted to block any movement of the upper longeron 7 and the lower longeron 8 in the transverse direction Y and to be in contact to form a weld line and to close the primary structure 6.

As represented in FIGS. 3, 4A and 4B, the notch 17 also includes a lip 11. In the context of the invention there is meant by lip 11 a surface forming with the abutment the notch 17. The lip 11 of the notch 17 formed in the upper part 10A extends in a direction parallel to the direction in which the upper longeron 7 extends. The lip 11 of the notch 17 formed in the lower part 10B extends in a direction parallel to the direction in which the lower longeron 8 extends. In a first embodiment the lip 11 and the abutment 12 are arranged in planes at an angle substantially equal to 90 degrees. In a second embodiment (not represented) the lip 11 and the abutment 12 form an angle greater than 90 degrees. The abutment 12 then extends in a plane parallel to the plane in which the internal panel 9A or the external panel 9B extends.

Moreover, the upper longeron 7 is provided with two ends 13 substantially parallel to one another. The lower longeron 8 is also provided with two ends 13 substantially parallel to one another. As represented in FIGS. 3, 4A and B, each of the ends 13 of the upper longeron 7, respectively of the lower longeron 8, is adapted to be positioned, in part or totally, in the notch 17 formed in each of the upper parts 10A, respectively of the lower parts 10B, of the internal panel 9A and the external panel 9B. In a preferred embodiment each of the ends 13 is formed of a contact face 15 to which at least a part of the abutment 12 is conformed.

Moreover, each of the ends 13 also includes a surface part 14 of the upper longeron 7, respectively the lower longeron 8. In a first embodiment that surface part 14 is not in contact with the lip 11 when the end 13 is positioned in the notch 17. The lip 11 and the surface part 14 are spaced apart from one another. As represented in FIG. 3, only the contact faces 15 of each of the ends 13 are in contact with the abutments 12 arranged facing them. In a second embodiment that surface part 14 is in contact with the lip 11 of the upper part 10A, respectively lower part 10B. The thickness of the upper longeron 7 in the vertical direction Z also represents the height of the contact face 15 in the vertical direction Z. Moreover, the abutment 12 is conformed to the contact face 15 so that the value of the height of the abutment 12 is substantially equal to the value of the height of the contact face 15.

In a preferred embodiment the internal panel 9A, the external panel 9B and the upper longeron 7, respectively the lower longeron 8, are assembled by a weld that connects each end part 10 of the internal panel 9A, external panel 9B to the end 13 of the upper longeron 7, lower longeron 8 with which it is in contact. The weld is a so-called edge-to-edge weld.

As represented in FIGS. 4A and 4B the weld produces a bead 16 that connects an end 13 of the upper longeron 7 (or the lower longeron 8) to an end part 10 of the internal panel 9A and to an end part 10 of the external panel 9B. The weld also produces a heat-affected zone (not represented) common to the welded together end 13 and notch 17. The bead 16 extends over a surface where the abutment 12 and the contact face 15 join. That junction surface is arranged in a plane substantially parallel to the plane in which the internal panel 9A (respectively the external panel 9B) extends. The weld bead 16 extends in the direction in which the longerons 7 and 8 extend, which correspond to the direction of the neutral fiber. Such an orientation enables fatigue of the bead 16 and consequently the risks of weakening of the weld to be minimized. This also limits the transfer of forces between the panels 9A, 9B and each longeron 7, 8. The weld bead 16 is not heavily loaded.

Moreover, in a preferred embodiment, each of the ends 13 of the upper longeron 7, respectively the lower longeron 8, is assembled by welding to an upper part 10A, respectively a lower part 10B. The welds are therefore produced in a symmetrical manner relative to the internal panel 9A and the external panel 9B so that deformations of the primary structure 6 in use are balanced. That balancing enables the risks of precocious appearance of weld faults to be minimized. It is therefore not necessary to use supplementary heat treatment to prevent precocious wear of certain parts of the primary structure 6.

Moreover, the lip 11 of the notch 17 enables projection of welding materials into the primary structure 6 to be prevented.

In a first embodiment the bead 16 has a depth in a direction inclined relative to the vertical direction Z the minimum value of which may be less than or equal to the value of the height of the abutment 12, as represented in FIG. 4A. In this first embodiment the surface part 14 of the upper longeron 7, respectively the lower longeron 8, is in contact with the lip 11 of the notch 17. In a variant of this first embodiment the surface part 14 is not in contact with the lip 11, as represented in FIG. 3.

In a second embodiment the bead 16 has a depth reaching the lip 11, as represented in FIG. 4B. The weld extends in the plane in which the lip 11 is arranged. In this second embodiment the surface part 14 of the longeron 7, 8 may be in contact with the lip 11. The weld then extends on the surface where the lip 11 is joined to the surface part 14. In a variant of this second embodiment the surface part 14 is not in direct contact with the lip 11. The surface part 14 and the lip 11 are spaced apart from one another, as represented in FIG. 3.

When the weld is produced at the junction surface between the abutment 12 and the contact face 15 without the surface part 14 of the longeron 7, 7A, 7B, 8 being in contact with the lip 11, that enables a tolerance to be preserved for possible deformation of the primary structure 6. On the other hand, when the surface part 14 of the longeron 7, 7A, 7B, 8 is in contact with the lip 11 it is not possible to preserve a tolerance for deformation at the level of the weld.

The weld is produced over a small thickness so as to minimize the thermal energy introduced into the material that forms the upper longeron 7 and the lower longeron 8 and the internal panel 9A and the external panel 9B.

Moreover, as described hereinabove, the upper longeron 7 comprises the front upper longeron 7A and the rear upper longeron 7B. The front upper longeron 7A and the rear upper longeron 7B are arranged in planes at a non-zero angle.

In one particular embodiment the weld is produced continuously along the ends 13 of the front upper longeron 7A and of the rear upper longeron 7B. In another particular embodiment the weld is produced discontinuously along the end 13 in the direction in which the lower longeron 8 extends (in the longitudinal direction X) and the upper longeron 7 extends (in directions at an angle to the longitudinal direction X).

The weld is continuous in the vertical direction Z.

Figure 5:
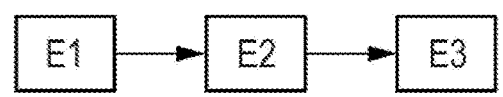
FIG. 5 illustrates a schematic representation of one embodiment of a welding method.

There is described hereinafter a method for welding a panel 9A, 9B to a longeron 7, 7A, 7B, 8 as represented in FIG. 5. That method includes the following steps:
- a step E1 of producing the notch 17 in each end part 10 of the internal panel 9A and the external panel 9B. The notch 17 is produced directly in the blanks of those panels 9A and 9B;
- a step E2 of positioning the end 13 of the longeron 7, 7A, 7B, 8 in the notch 17 of the panel 9A, 9B; and
- a step E3 of edge-to-edge type welding of the end 13 to the notch 17.

Moreover, the pylon 1 is of a design that simplifies the production of the primary structure 6. The edge-to-edge welding of panels and longerons has the following advantages:
- a reduction of the mass of the primary structure 6 through the absence of bolt type fixing means and the absence of edges;
- saving the cost of the bolt type fixing means; and
- the possibility of carrying out non-destructive testing during the production of the primary structure.

Moreover, the edge-to-edge weld enables reduction of raw material wastage. In fact, the notch 17 in which the weld is produced is formed directly in the blank of the panels 9A, 9B. Such a blank is of small size because of the absence of edges. Moreover, the longeron 7, 7A, 7B, 8 necessitates no particular machining because it is positioned in the notch 17.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A pylon intended to support an engine of a flying vehicle, said pylon comprising a primary structure formed by at least one longeron and a first panel and a second panel,
wherein said first panel comprises at least one first end part in which is formed a first notch including a first lip, said second panel comprises at least one second end part in which is formed a second notch including a second lip, said at least one longeron provided with a first end adapted to be positioned in the first notch and a second end adapted to be positioned in the second notch, said first and second panels and said at least one longeron assembled by welding at least a part of said first end and said second end of said at least one longeron to at least a part of said first notch and second notch, respectively, said first end including a first surface part of said at least one longeron, said second end including a second surface part of said at least one longeron, said first surface part and said first lip of the first notch spaced apart from one another, and said second surface part and said second lip of the second notch spaced apart from one another.

2. The pylon as claimed in claim 1, wherein said first notch is formed of a first abutment, said first end of said at least one longeron including a first contact face, at least a part of said first abutment conformed to said first contact face.

3. The pylon as claimed in claim 1, wherein the first lip is arranged in a plane parallel to said at least one longeron, said first lip forming an angle with the first abutment equal to 90 degrees.

4. The pylon as claimed in claim 1, wherein the first lip is arranged in a plane parallel to said at least one longeron, said first lip forming an angle with the first abutment greater than 90 degrees.

5. The pylon as claimed in claim 2, wherein the weld is produced on a junction surface of at least a part of said first abutment with said first contact face.

6. The pylon as claimed in claim 1, wherein the weld is produced in a continuous manner along said first end of the at least one longeron.

7. The pylon as claimed in claim 1, wherein the weld is produced in a discontinuous manner along said first end of the at least one longeron.

8. A method of welding the first panel, the second panel and at least one longeron forming part of the pylon as claimed in claim 1, said method comprising:
producing the first notch in the first end part of said first panel;
producing the second notch in the second end part of said second panel;
positioning said first end and said second end of said at least one longeron in said first notch in said first panel and in said second notch in said second panel, respectively; and
welding a part of said first end of said at least one longeron to at least a part of said first notch and welding a part of said second end of said at least one longeron to least a part of said second notch.

9. A flying vehicle comprising a pylon as claimed in claim 1.

10. An aircraft comprising a pylon as claimed in claim 1.

* * * * *